United States Patent
Angus et al.

(10) Patent No.: US 6,574,969 B1
(45) Date of Patent: Jun. 10, 2003

(54) APPARATUS FOR RAPIDLY PRODUCING CRYOGENICALLY FROZEN DESSERT PARTICLES

(76) Inventors: Nicholas W. Angus, 7E Newcastle Dr., The Park Nottingham (GB), NG71AA; Thomas R. Mosey, 919 River Rd., Mystic, CT (US) 06355

( * ) Notice: Subject to any disclaimer, the term of this patent is extended or adjusted under 35 U.S.C. 154(b) by 0 days.

(21) Appl. No.: 10/008,972

(22) Filed: Dec. 6, 2001

Related U.S. Application Data

(62) Division of application No. 09/800,124, filed on Mar. 4, 2001.

(51) Int. Cl.$^7$ ................................................ F25D 17/02
(52) U.S. Cl. ............................... 62/64; 62/374; 62/380
(58) Field of Search ............................ 62/64, 374, 380

(56) References Cited

U.S. PATENT DOCUMENTS

| | | | | |
|---|---|---|---|---|
| 1,827,629 A | * | 10/1931 | Vogt ............................ 62/341 |
| 1,924,988 A | * | 8/1933 | Grayson et al. .............. 452/74 |
| 3,302,423 A | * | 2/1967 | Morrison ..................... 34/242 |
| 3,832,864 A | | 9/1974 | Rasovich ..................... 62/374 |
| 3,857,974 A | | 12/1974 | Aref ............................ 426/148 |
| 4,077,227 A | | 3/1978 | Larson ......................... 62/74 |
| 4,354,357 A | * | 10/1982 | Hofstetter .................... 62/216 |
| 4,479,363 A | | 10/1984 | Gibson ......................... 62/64 |
| 4,539,824 A | * | 9/1985 | Kuraoka et al. .............. 165/94 |
| 4,655,047 A | | 4/1987 | Temple ......................... 62/64 |
| 4,687,672 A | | 8/1987 | Vitkovsky .................... 426/524 |
| 4,704,873 A | | 11/1987 | Imaike .......................... 62/64 |
| 4,952,224 A | * | 8/1990 | Lilakos ........................ 264/534 |
| 5,126,156 A | | 6/1992 | Jones .......................... 426/418 |
| 5,417,074 A | * | 5/1995 | McAfee et al. ............... 62/374 |
| 5,533,343 A | * | 7/1996 | Moshier et al. .............. 62/374 |
| 5,664,422 A | | 9/1997 | Jones ........................... 62/64 |
| 5,715,688 A | * | 2/1998 | Jones, III .................... 62/374 |
| 5,966,962 A | * | 10/1999 | Murray et al. ............... 62/374 |
| 6,000,229 A | | 12/1999 | Jones ........................... 62/74 |

FOREIGN PATENT DOCUMENTS

| | | |
|---|---|---|
| CA | 1 264 439 | 2/1972 |
| CA | 964 921 | 3/1975 |

* cited by examiner

*Primary Examiner*—William E. Tapolcai
*Assistant Examiner*—Mohammad M. Ali
(74) *Attorney, Agent, or Firm*—Rudolf O. Siegesmund

(57) ABSTRACT

An apparatus for rapidly producing cryogenically frozen dessert particles is disclosed. The machine comprises a refrigerated mixer, a plurality of hoses connecting the refrigerated mixer to a filling head, a bath having a housing and a tank for liquid nitrogen, a bath belt rotatably engaged to the housing, a cluster cylinder rotatably engaged to the housing, and a delivery belt. The method of employing the apparatus comprises the steps of placing a mix into the refrigerated mixer, pumping the mix through the plurality of hoses into the filling head, allowing the mix to stream into liquid nitrogen in a tank in the bath, carrying the particles formed out of the liquid nitrogen by means of a conveyor belt, breaking up clumps of particles and transporting the particles to a channel guide for weighing and packaging.

14 Claims, 6 Drawing Sheets

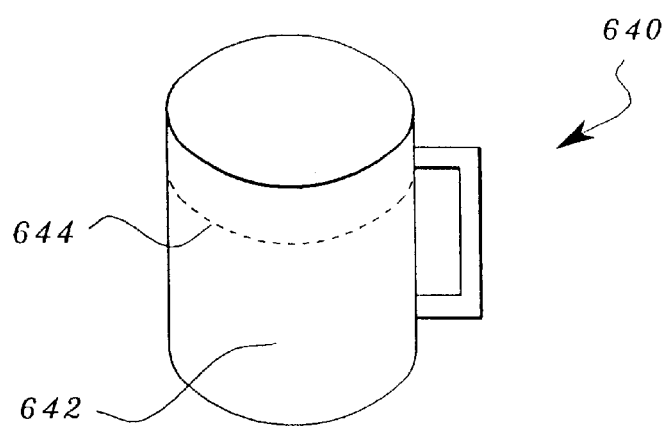
Fig. 6b
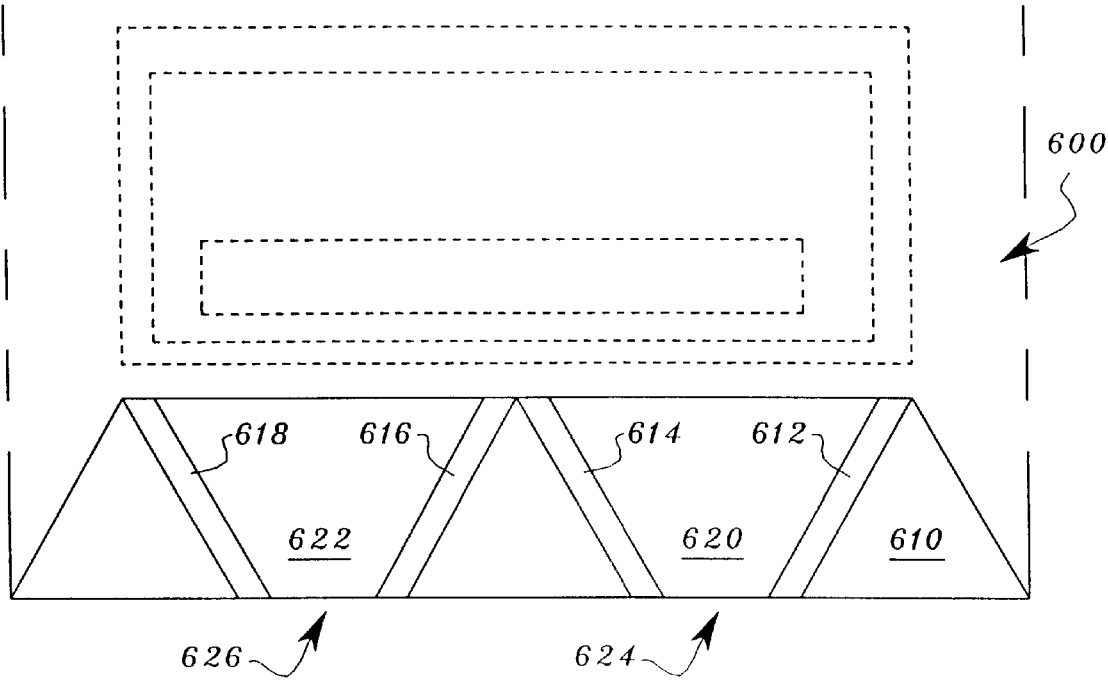
Fig. 6a

APPARATUS FOR RAPIDLY PRODUCING CRYOGENICALLY FROZEN DESSERT PARTICLES

This is a division of Ser. No. 09/800,124, filed Mar. 4, 2001.

FIELD OF THE INVENTION

The present invention relates to an apparatus and method for rapidly freezing and packaging dessert particles such as cream, ice cream or flavored water.

BACKGROUND OF THE INVENTION

U.S. Pat. No. 3,832,864 discloses a quick freezing machine having an insulated tank for holding liquid nitrogen and an endless slack conveyor belt supported between opposite sides of the tank with all but the endmost portions fully immersed in the bath. U.S. Pat. No. 3,857,974 (the '974 patent) discloses a method and apparatus of cryogenic freezing of discrete particles of homogenized egg yolk and egg white. A peristaltic pump causes the discrete particles to fall into liquid nitrogen, and the frozen particles, ranging in size from 3 mm to 7 mm, are removed from the liquid nitrogen by a screw conveyor. UK Patent GB 2 092 880 discloses an apparatus for freezing drops of cream into solid pellets carried by flowing liquid nitrogen. U.S. Pat. No. 4,479,363 discloses a method of freezing a continuous pulsating stream of a liquid such as cream into discrete spheroidal bodies. U.S. Pat. 5,126,156 discloses a method of dripping an alimentary composition from a feed tray into liquid nitrogen to form beads.

What is needed beyond the prior art is a method of rapidly freezing and packaging dessert particles such as cream, ice cream, or flavored water.

SUMMARY OF THE INVENTION

The invention which meets the needs identified above is a machine for rapidly producing cryogenically frozen dessert particles comprising a refrigerated mixer, a plurality of hoses connecting the refrigerated mixer to a filling head, a bath having a housing and a tank for liquid nitrogen, a bath belt rotatably engaged to the housing, a cluster cylinder rotatably engaged to the housing, and a delivery belt. The method of employing the apparatus comprises the steps of placing a mix into the refrigerated mixer, pumping the mix through the plurality of hoses into the filling head, allowing the mix to stream into liquid nitrogen in a tank in the bath, carrying the particles formed out of the liquid nitrogen by means of a conveyor belt, breaking up clumps of particles and transporting the particles to a channel guide for weighing and packaging.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 6A depicts a front view of the guide channels;

FIG. 6B depicts a scoop marked for a volumetric gallon; and

DETAILED DESCRIPTION OF THE PREFERRED EMBODIMENT

Figure 1:
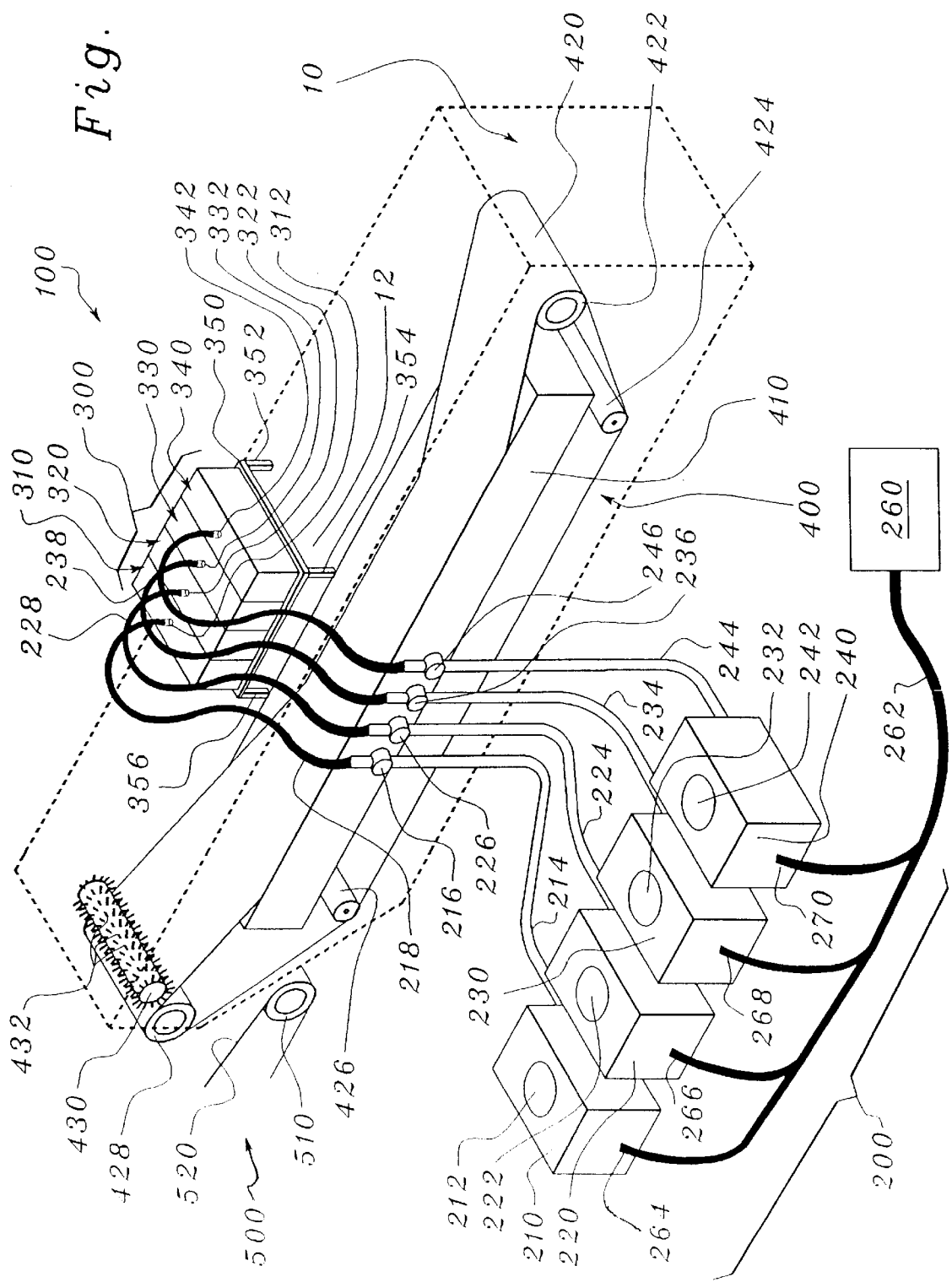
FIG. 1 depicts a left side perspective view of the machine.

FIG. 1 depicts machine 100 having refrigerated mixer 200, filling head 300, bath 400 and post cooler 500. Refrigerated mixer 200 has first container 210, second container 220, third container 230 and fourth container 240. First container 210 has first lid 212, first pipe 214, first valve 216, first hose 218 and first electrical connection 264. Second container 220 has second lid 222, second pipe 224, second valve 226, second hose 228 and second electrical connection 266. Third container 230 has third lid 232, third pipe 234, third valve 236, third hose 238 and third electrical connection 268. Fourth container 240 has fourth lid 242, fourth pipe 244, fourth valve 246, fourth hose 248 and fourth electrical connection 270. Each of first container 210, second container 220, third container 230 and fourth container 240 are refrigerated, have an internal rotatable mixing arm (not shown), a pump (not shown) and are connected to power supply 260 by connecting wires 262 which are connected to first electrical connection 264, second electrical connection 266, third electrical connection 268 and fourth electrical connection 270. In the preferred embodiment, refrigerated mixer 200 is made of stainless steel.

Filling head 300 has first bin 310, second bin 320, third bin 330, fourth bin 340 and filling head support 350. First bin 310 has first connector 312 for removable engagement of first hose 218. Second bin 320 has second connector 322 for removable engagement of second hose 228. Third bin 330 has third connector 332 for removable engagement of third hose 238. Fourth bin 340 has fourth connector 342 for removable engagement of fourth hose 248. First bin 310, second bin 320, third bin 330 and fourth bin 340 are removably engaged to filling head support 350. First leg 352, second leg 354, third leg 356 and fourth leg (not shown) are fixedly engaged to filling head support 350 and removably engaged to housing 10 of bath 400.

Bath 400 has housing 10, tank 410, bath belt 420 and cluster cylinder 430. Housing 10 has first aperture 12 beneath filling head 300. Bath belt 420 is removably and rotatably engaged to first roller 422, second roller 424, third roller 426 and fourth roller 428. Housing 10 has second aperture (not shown) whereby bath belt 420 and fourth roller 428 extend outward from housing 10. Cluster cylinder 430 has a plurality of cluster cylinder arms 432. Cluster cylinder 430 is rotatably engaged to housing 10.

Figure 2:
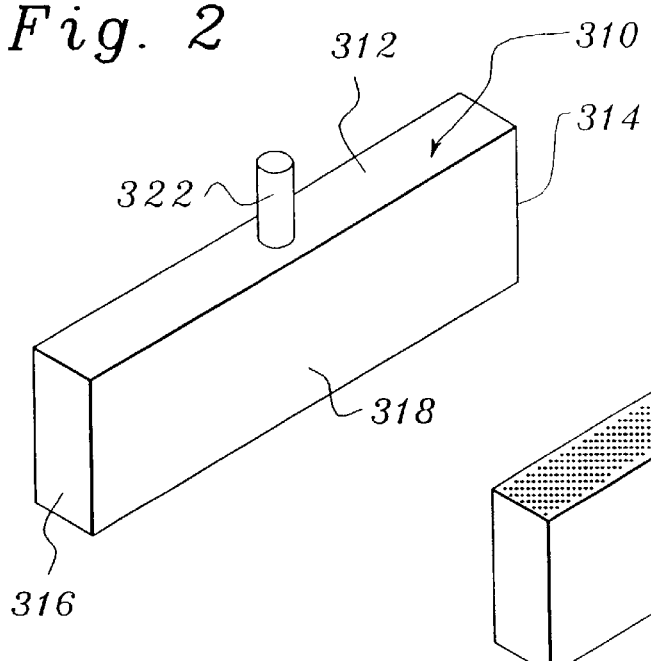
FIG. 2 depicts a left side perspective view of a bin.
Figure 3:
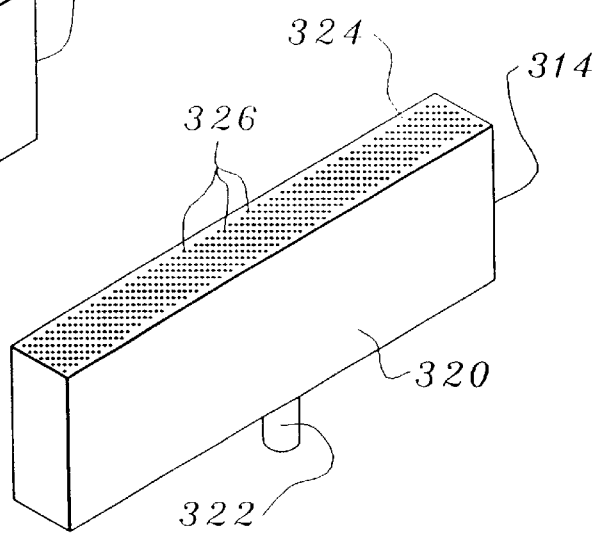
FIG. 3 depicts a perspective view of the bottom of a bin.

FIG. 2 and FIG. 3 depict first bin 310. First bin 310 has first bin side 314, second bin side 318, third bin side 316, fourth bin side 320, bin top 312, first connector 322, bin bottom 324 and a plurality of bin holes 326. First bin 310 is representative of second bin 320, third bin 330 and fourth bin 340 and, hereinafter, references to first bin 310 shall include references to second bin 320, third bin 330 and fourth bin 340.

Figure 4:
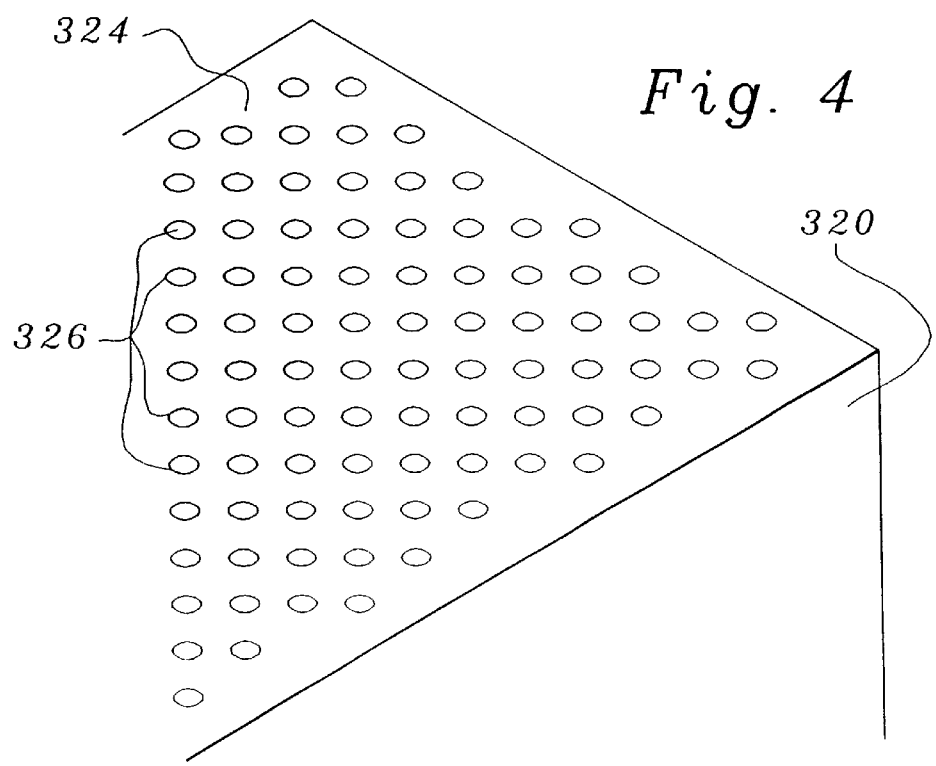
FIG. 4 depicts a detailed view of the bottom of af bin.

FIG. 4 depicts a detailed view of first bin bottom 324 of first bin 310 and bin holes 326. In the preferred embodiment, bin bottom 324 has approximately 1800 bin holes 326 arranged into an approximate 20×90 pattern with each of said bin holes 326 having an approximate ⅛ inch diameter. In other embodiments, first bin bottom 324 may have any number of bin holes 326.

Figure 5:
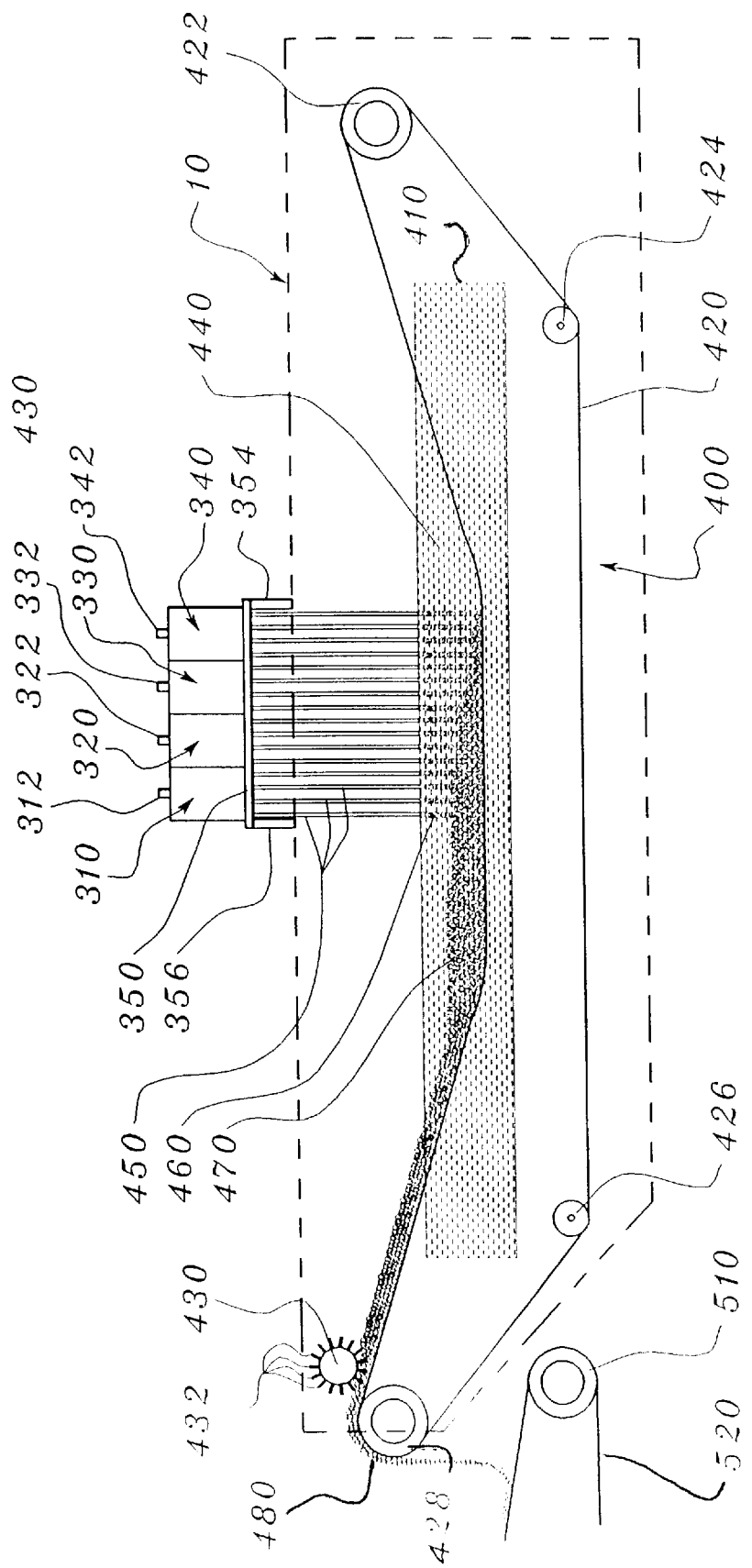
FIG. 5 depicts a left side view of the machine.

FIG. 5 depicts machine 100 in operation. Tank 410 is filled with liquid nitrogen. First bin 310, second bin 320, third bin 330 and fourth bin 340 are filled with mix 450 which falls through bin holes in bin bottoms as shown in FIG. 3 and FIG. 4 for first bin 310. In the preferred embodiment mix 450 is an ice cream mix. Alternatively, mix 450 may be flavored water. Further in the alternative, mix 450 may be any milk, cream or water based mix capable of producing a dessert product. When mix 450 contacts the liquid nitrogen in tank 410, mix 450 freezes into particles. The weight of mix 450 in first bin 310 causes mix 450 to fall in unbroken streams through first bin holes 326 in first bin bottom 324 of first bin 310. The unbroken liquid streams fall into the liquid nitrogen and freeze into particles 470. Particles 470 consist of a mixture of roundish particles and irregularly shaped particles including "popcorn." Particles 470 fall through the liquid nitrogen for a distance of 2–4 inches and come to rest on bath belt 420. The depth of the liquid nitrogen in tank 410 varies between 2–4 inches because the liquid nitrogen evaporates during the operation, and liquid nitrogen must be added periodically to maintain the depth. As bath belt 420 moves, particles 470 that have landed on bath belt 420 are moved under other falling particles 470, and a "piling on" effect occurs. This "piling on" effect causes clumping of particles 470. Furthermore, the "piling on" effect causes masses of particles 470 to rise several inches above bath belt 420. Bath belt 420 carries particles 470 up and out of the liquid nitrogen. Clumps of particles 470 and masses of particles 470 are broken up by cluster cylinder arms 432 protruding from cluster cylinder 430. In addition, large particles 470 are broken up by cluster cylinder arms 432 into smaller particles 470. Particles 470 fall from bath belt 420 onto travel belt 520. Travel belt 520 is rotatably engaged in post cooler 500. Clumps of particles 470 are further broken up by falling from bath belt 420 to travel belt 520. Additional travel belts 520 may be included in post cooler 500 so that clumps of particles 470 will fall from a first travel belt to a second travel belt and then from a second travel belt to a third travel belt. Each time particles 470 fall, additional clumps of particles 470 that are clumped or stuck together are further broken up.

Referring to FIG. 6A, when particles 470 emerge from post cooler 500, particles 470 fall off travel belt 520 onto guide 600. Guide 600 is made from base 610, a first guide 612, a second guide 614, a third guide 616 and a fourth guide 618. First guide 612 and second guide 614 are fixedly engaged to base 610 creating a channel so that particles 470 falling from travel belt 520 will be guided between first guide 612 and second guide 614 to first opening 624 at the end of base 610. Third guide 616 and fourth guide 618 are fixedly engaged to base 610 creating a channel so that particles 470 falling from travel belt 520 will be guided between third guide 616 and fourth guide 618 to second opening 626 at the end of base 610. Base 610 is slanted out away from post cooler 500. Particles 470 are manually pushed off the slanted surface of guide 600 into first insulated chest 630 and second insulated chest 632.

Referring to FIG. 6B, first insulated chest 630 and second insulated chest 632 are removed from beneath guide 600 and scoop 640 is used to transfer particles 470 to a plastic bag (not shown) by pouring the contents of scoop 640 into the plastic bag. Scoop 640 holds a volumetric gallon. Mark 644 on scoop 642 indicates when a volumetric gallon has been placed into scoop 640. Title 21 of the Code of Federal Regulations Part 135, Subpart B, Sec. 135.110 states that "ice cream contains not less than 1.6 pounds of total solids to the gallon, and weighs not less than 4.5 pounds to the gallon." The plastic bags are weighed to ensure that each bag contains at least 4.5 pounds of particles 470. The plastic bags are sealed using a heat sealing device (not shown). A single small hole is poked in each bag using a stainless steel needle (not shown) in order to allow residual nitrogen gas and expanding air to escape. The plastic bags are placed into a cardboard box (not shown) with six bags per box. The boxes are then placed into a freezer room (not shown) and stored.

Figure 7A:
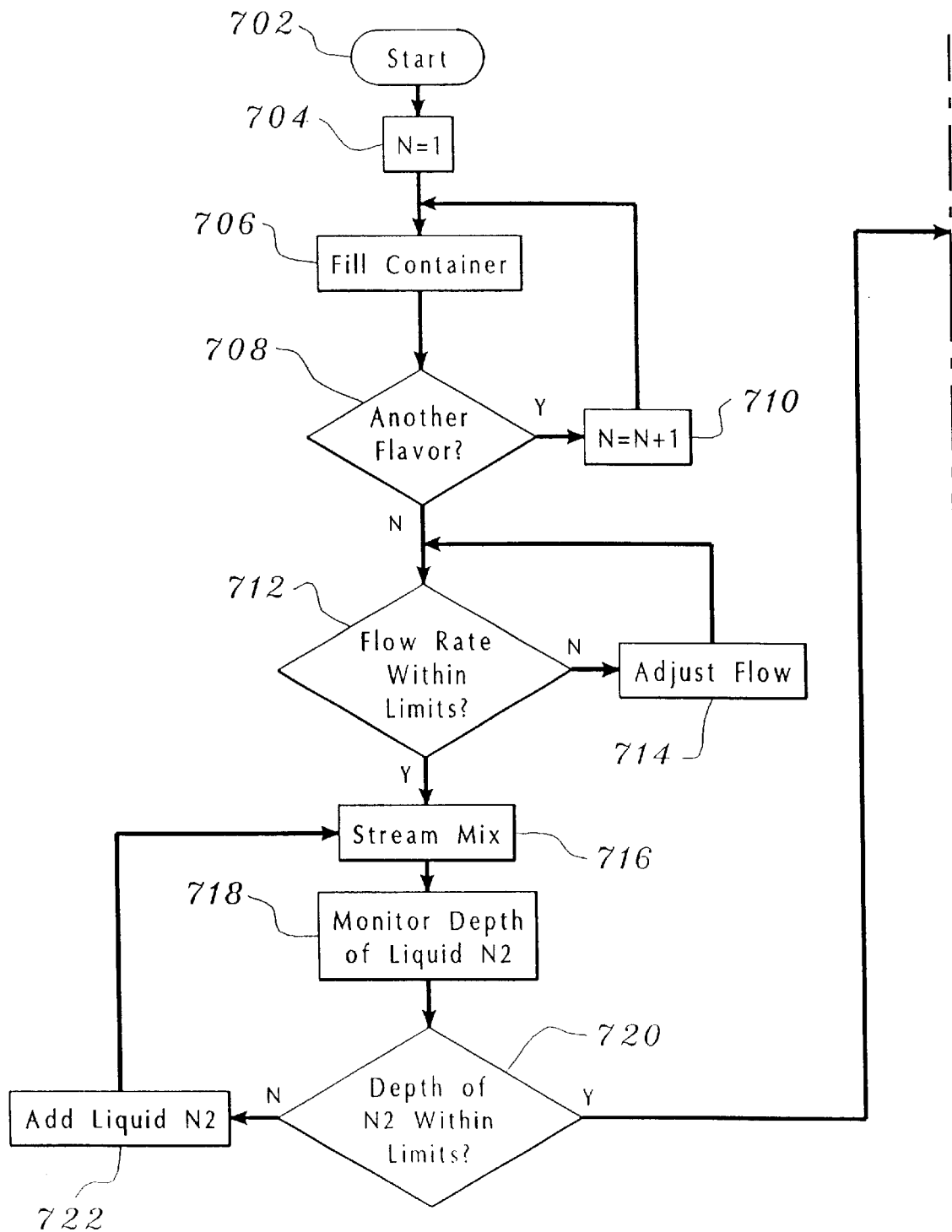
FIG. 7 depicts a flow chart of the process.
Figure 7B:
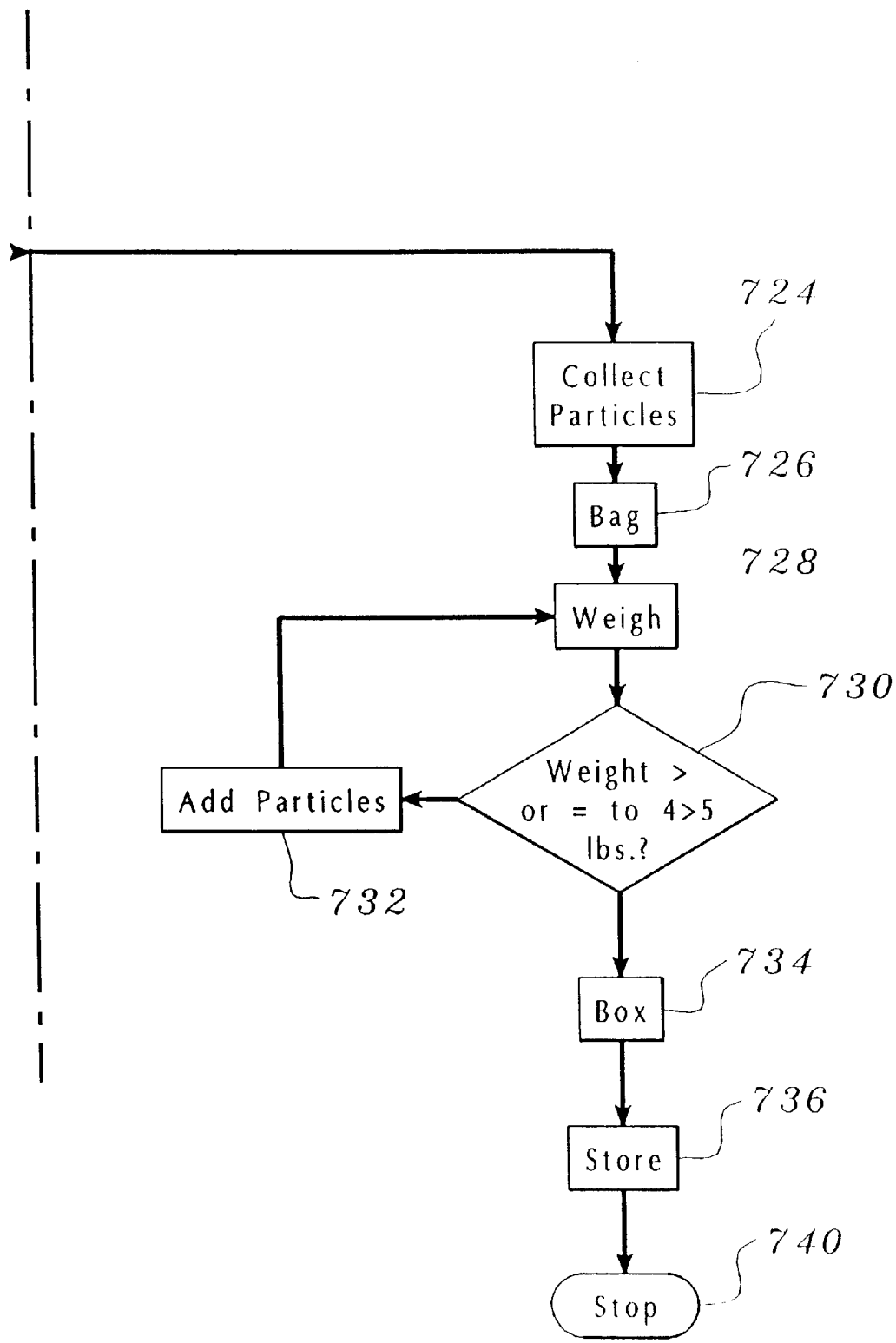

FIG. 7 depicts a flow chart for the method of rapidly producing cryogenically frozen dessert particles. Referring to FIGS. 1–6 and FIG. 7, the process begins (702). Initially N is set equal to 1, where N equals the number of flavors to be produced. First container 210 is filled with mix 450 (706). A determination is made as to whether another flavor is to be produced. If another flavor is to be produced, then N is set equal to N+1, the process returns to step 706, and second container 220 will be filled. In the preferred embodiment, N will not be greater than 4; however, additional containers could be added to increase the number of flavors that can be combined in one production run. If another flavor is not to be produced, then a determination is made as to whether the flow rate is within limits (712). The mix is pumped from first container 210 (and any other containers that have been filled with mix 450) to first bin 310 (and to any other bins receiving mix from a container). The limits are determined for mix 450 so that the depth of mix 450 in filling head 300 is not less than that depth sufficient to cause mix 450 to fall in unbroken streams through first bin holes 326 of first bin 310. In addition, the upper limit is established so that the depth of mix 450 in filling head 300 will not overflow filling head 300. If the flow rate is not within limits, then the flow is adjusted (714). The flow rate may be adjusted either by opening or closing first valve 216 or controlling the pump speed of first container 210 (and likewise for each of the other containers and corresponding valves). If the flow rate is within limits, then the liquid mix is streamed into tank 410 (716). The depth of liquid nitrogen in tank 410 is monitored (718) A determination is made as to whether the depth of liquid nitrogen is within limits (720). If the depth of liquid nitrogen is not within limits, then liquid nitrogen is added to bath (722). The limits for the depth of liquid nitrogen in tank 410 are that the depth of liquid nitrogen in tank 410 will be greater than or equal to 2 inches above bath belt 420 and less than or equal to 4 inches above bath belt 420. If the depth of liquid nitrogen is within limits, then additional liquid nitrogen is not added. Next, particles 470 are collected (724) and particles 470 are bagged (726). Each bag is weighed (728). A determination is made as to whether the bag weight is equal to or greater than 4.5 pounds. If the weight is less than 4.5 pounds, then particles are added (732). If the weight is greater than or equal to 4.5 pounds, then the bag is sealed and placed in a cardboard box (734). When the box is filled with six bags, the box is sealed and stored (736). The process stops (740). It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An apparatus for rapidly producing cryogenically frozen dessert particles comprising:
   a filling head having a filling head connector;
   a mixer having a hose removably engaged to the filling head connector;
   a bath having a tank, a housing, a bath belt rotatably engaged to said housing, and a cluster cylinder rotatably engaged to said housing;

a filling head support removably engaged to said housing; and a travel belt;

wherein said tank contains liquid nitrogen and the depth of said liquid nitrogen is maintained between approximately 2 inches and 4 inches above the bath belt; and wherein the filling head is removably engaged to the filling head support so that the filling head is positioned above the tank.

2. The apparatus of claim 1 wherein said filling head further comprises:

a bin having a plurality of holes.

3. The apparatus of claim 1 wherein said mixer further comprises:

a container;

a lid removably engaged to said container;

a valve;

a pipe removably engaged to the container and to the valve; and a hose removably engaged to the valve and to the connector.

4. The apparatus of claim 1 wherein said cluster cylinder further comprises a plurality of cluster cylinder arms.

5. The apparatus of claim 1 further comprising a post cooler.

6. The apparatus of claim 1 wherein said travel belt further comprises a first travel belt and a plurality of second travel belts.

7. The apparatus of claim 1 further comprising a channel guide having a base and a plurality of guides.

8. The apparatus of claim 1 further comprising a scoop.

9. The apparatus of claim 1 further comprising an insulated chest.

10. An apparatus for rapidly producing cryogenically frozen dessert particles comprising:

a filling head having a filling head connector;

a mixer having a hose removably engaged to the filling head connector;

a bath having a tank, a housing, a bath belt rotatably engaged to said housing, and a cluster cylinder rotatably engaged to said housing;

a post cooler; and a travel belt rotatably engaged to said post cooler;

wherein said tank contains liquid nitrogen and the depth of said liquid nitrogen is maintained between approximately 2 inches and 4 inches above the bath belt;

wherein said filling head further comprises a bin having a plurality of holes and a filling head support removably engaged to said housing;

wherein said mixer further comprises a container, a lid removably engaged to said container, a valve, a pipe removably engaged to the container and to the valve and a hose removably engaged to the valve and to the connector; and wherein said cluster cylinder further comprises a plurality of cluster cylinder arms.

11. The apparatus of claim 10 wherein said travel belt further comprises a first travel belt and a plurality of second travel belts.

12. The apparatus of claim 10 further comprising a channel guide having a base and a plurality of guides.

13. The apparatus of claim 10 further comprising a scoop.

14. The apparatus of claim 10 further comprising an insulated chest.

\* \* \* \* \*